United States Patent
Kurz et al.

(10) Patent No.: US 8,145,346 B2
(45) Date of Patent: Mar. 27, 2012

(54) METHOD FOR MONITORING A PHYSICAL STATE OF A HOT-ROLLED SHEET WHILE CONTROLLING A ROLLING TRAIN FOR REVERSE ROLLING THE HOT-ROLLED SHEET

(75) Inventors: Matthias Kurz, Erlangen (DE); Birger Schmidt, Brand-Erbisdorf (DE); Klaus Weinzierl, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 362 days.

(21) Appl. No.: 12/311,482

(22) PCT Filed: Oct. 2, 2007

(86) PCT No.: PCT/EP2007/060421
§ 371 (c)(1),
(2), (4) Date: Mar. 31, 2009

(87) PCT Pub. No.: WO2008/043684
PCT Pub. Date: Apr. 17, 2008

(65) Prior Publication Data
US 2009/0326700 A1 Dec. 31, 2009

(30) Foreign Application Priority Data
Oct. 9, 2006 (DE) .......................... 10 2006 047 718

(51) Int. Cl.
*B21B 37/00* (2006.01)
*G06F 19/00* (2006.01)
(52) U.S. Cl. ........................ 700/150; 700/148; 29/527.7
(58) Field of Classification Search ................. 700/108, 700/148–156, 31; 29/407.05, 527.7
See application file for complete search history.

(56) References Cited

U.S. PATENT DOCUMENTS

| | | | | |
|---|---|---|---|---|
| 5,827,056 A | * | 10/1998 | Rohrbaugh et al. | ............... 432/8 |
| 6,526,328 B1 | | 2/2003 | Maguin et al. | |
| 6,807,449 B1 | * | 10/2004 | Schlang et al. | ................ 700/48 |
| 2004/0205951 A1 | * | 10/2004 | Kurz et al. | ................ 29/407.05 |
| 2007/0151635 A1 | | 7/2007 | Sano et al. | |

FOREIGN PATENT DOCUMENTS

DE  4338608 A1  8/1995
(Continued)

OTHER PUBLICATIONS

Communication/Office Action from Chinese Patent Office citing reference, Oct. 13, 2011, pp. 1-12.

(Continued)

*Primary Examiner* — Albert Decady
*Assistant Examiner* — Steven Garland

(57) ABSTRACT

A method of monitoring the physical state of a hot-rolled sheet or hot-rolled strip while controlling a plate rolling train for the reversing working a hot-rolled sheet or hot-rolled strip. For the reversing rolling of the hot-rolled sheet or hot-rolled strip a rolling stand is provided. At a starting point, an initial state of the hot-rolled sheet or hot-rolled strip in a model is determined, from which state at least one physical state variable is derived. Further, a cyclical updating of the state during the working of the hot-rolled sheet by using the model of the hot-rolled sheet or hot-rolled strip and the plate rolling train is provided, wherein monitoring of the path of the hot-rolled sheet or hot-rolled strip and operating parameters influencing and/or reproducing the state are taken into account.

17 Claims, 2 Drawing Sheets

FOREIGN PATENT DOCUMENTS

| | | |
|---|---|---|
| DE | 19514457 A1 | 10/1996 |
| DE | 10211623 A1 | 10/2003 |
| DE | 69907354 T2 | 4/2004 |
| DE | 10310357 A1 | 9/2004 |
| RU | 2177847 C1 | 1/2002 |
| WO | WO 9818970 A1 | 5/1998 |
| WO | WO 2004050923 A1 | 6/2004 |
| WO | WO 2006040823 A1 | 4/2006 |

OTHER PUBLICATIONS

Communication from Russian Patent Office citing reference, Nov. 30, 2011.

\* cited by examiner

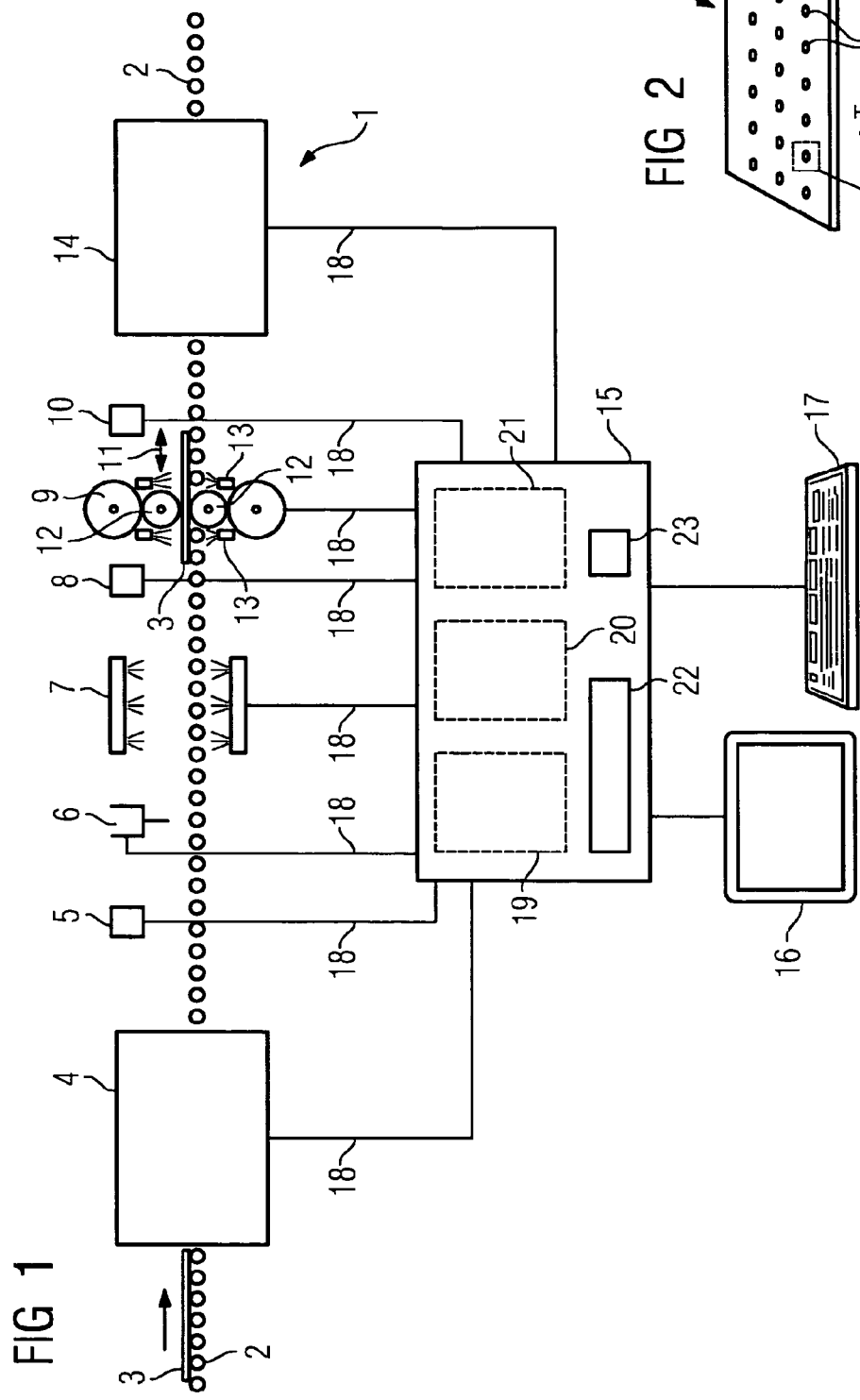

METHOD FOR MONITORING A PHYSICAL STATE OF A HOT-ROLLED SHEET WHILE CONTROLLING A ROLLING TRAIN FOR REVERSE ROLLING THE HOT-ROLLED SHEET

CROSS REFERENCE TO RELATED APPLICATIONS

This application is the US National Stage of International Application No. PCT/EP2007/060421 filed Oct. 2, 2007 and claims the benefit thereof. The International Application claims the benefits of German Patent Application No. 10 2006 047 718.9 DE filed Oct. 9, 2006, both of the applications are incorporated by reference herein in their entirety.

FIELD OF INVENTION

The invention relates to a method for monitoring the physical state of a hot-rolled sheet or hot-rolled strip while controlling a rolling train for reverse working of a hot-rolled sheet or hot-rolled strip and comprising at least one rolling stand for reverse rolling of the hot-rolled sheet or hot-rolled strip.

BACKGROUND OF INVENTION

In plate rolling trains, a slab of defined length is rolled into a sheet in a plurality of passes by rollers. Because the slab is heated, reference is also made to a hot-rolled sheet or hot-rolled strip. For the purpose of rolling the hot-rolled sheet or hot-rolled strip, use is made of at least one rolling stand, through which the hot-rolled sheet or hot-rolled strip is moved back and forth until the required number of passes is reached, i.e. the desired thickness of the sheet is produced. This operation is also called reversing.

For hot-rolled strips, use is made in particular of Steckel mills comprising one or more rolling stands that are arranged between two coilers onto which the strip can be wound.

In this case, it is also common practice to provide two rolling stands, the first rolling stand being used for blooming and the second rolling stand for finish rolling. The hot-rolled sheet or hot-rolled strip is moved back and forth in both rolling stands.

This differs from a continuous production line, in which a metal strip is fed progressively through rolling stands which are arranged one after the other. At the end of a production line, the finished strip is wound onto so-called coils.

In order to allow automation in a rolling train, such that the desired target parameters of the sheet or strip (e.g. target thickness, width, etc.) are achieved as precisely as possible, the temperature distribution in the hot-rolled sheet or hot-rolled strip is determined at a specific location, e.g. using a model or by means of a temperature measurement, e.g. using a pyrometer. In this case, the temperature can be determined at a plurality of points on the hot-rolled sheet or hot-rolled strip, thereby ultimately producing a temperature distribution. A model of the plate rolling train and the hot-rolled sheet or hot-rolled strip is then used to determine work parameters of the individual train components, e.g. the descaling unit, cooling or heating devices and obviously the rolling stand, such that the desired sheet parameters are achieved in the context of desired material properties. In particular, the temperature influences of the individual components of the plate rolling train are taken into consideration here. As part of the so-called precalculation, the temperature of the hot-rolled sheet or hot-rolled strip is therefore determined at specific positions depending on the assumed future temperature influences, in particular at the action positions of the components of the plate rolling train, and the required parameters which must be used to control the components are determined therefrom.

Nevertheless, discrepancies occur during the actual rolling operation because it is not possible to calculate all influences perfectly in advance. It is therefore common practice during the rolling process to record and store operating parameters, e.g. sensor values, which represent a temperature influence. Tracking systems which allow tracking of each individual point of the hot-rolled sheet or hot-rolled strip are also well known. This information is routinely used to perform a postcalculation at the cited action positions, or shortly after or before or at other specific positions, using the actual operating parameters but the same model. This postcalculation provides a current temperature which is used as a basis for a new precalculation. In rare cases, it is also normal practice to perform a comparison between the current temperature and the precalculated temperature before a new precalculation, and only to perform a new precalculation in the case of a significant difference. In practice, however, evidence shows that discrepancies occur in most cases, and therefore a new precalculation for updating the work parameters is generally performed without prior comparison operations. A new precalculation of this type is frequently also called a recalculation.

Both the postcalculation based on the recorded operating parameters, which represent the temperature influences, and the recalculation require a non-negligible time that can extend into seconds. During this time, effective processing time is lost for the hot-rolled sheet or hot-rolled strip, which is also standing still and will automatically continue to cool. In addition, significant computing power is required for the postprocessing and the new preprocessing.

Although only the temperature of the hot-rolled sheet or hot-rolled strip has been mentioned so far, this is merely one of a plurality of state variables which in effect describe the state of the hot-rolled sheet or hot-rolled strip. Equally relevant for the processing properties are e.g. the phase distribution, the residual work-hardness or grain sizes, this likewise can be established using models and suitable measurements.

SUMMARY OF INVENTION

An object of the invention is to specify a method which allows more effective calculation and hence faster throughput times and less computing effort.

In order to solve this problem, a method of the type cited in the introduction makes provision for the following steps:
at a starting point, determining an initial state of the hot-rolled sheet or hot-rolled strip in a model, from which at least one physical state variable can be derived,
cyclically updating the state during the working of the hot-rolled sheet or hot-rolled strip, using the model of the hot-rolled sheet or hot-rolled strip and the rolling train, wherein tracking of the hot-rolled sheet or hot-rolled strip and operating parameters which influence and/or represent the state are taken into consideration.

The "state monitor" described above can advantageously be used for controlling the rolling train. In particular, when at least one predetermined event occurs, it is possible iteratively to ascertain precalculated states and hence future sheet processing parameters in the context of a precalculation on the basis of a previously ascertained state, in particular the current state.

The state of the hot-rolled sheet or hot-rolled strip is essentially understood to mean properties that are described with reference to a mathematical model, in particular thermal properties, which are relevant for the working of the hot-rolled sheet or hot-rolled strip. By means of this mathematical description, possibly in conjunction with the model, it is possible to derive state variables which describe the properties of the hot-rolled sheet or hot-rolled strip, said variables advantageously being locally distributed. Such state variables can be, for example, the temperature and/or the residual work-hardness and/or the phase portions and/or grain sizes and/or the enthalpy. Although the temperature is frequently used as an example in the following, most of the statements nonetheless apply to all conceivable state variables.

The state is ultimately at least defined by parameters which describe with sufficient accuracy the distribution of the values of the state variables within the hot-rolled sheet or hot-rolled strip. In this case, two possibilities are conceivable in particular. On the one hand, the state can be described by a parameterized state function. This idea relates to e.g. a polynomial of specific magnitude in three dimensions, whose coefficients are used as parameters and which represents e.g. a temperature distribution or a residual work-hardness distribution. Alternatively or additionally, the state can also be described by at least one state variable or the state variables at various sheet points of the hot-rolled sheet or hot-rolled strip. In this case, relatively simple initialization is possible using a measuring device, for example, if measured values are recorded at the measurement points and assigned to the sheet points, possibly as a profile over the thickness. In an advantageous embodiment, for example, provision can be made for the state to be described by local temperature profiles at the various sheet points. The initial temperature profiles at the various sheet points should not just represent temperature information for specific points, but should contain depth information representing the course of the temperature through the thickness of the hot-rolled sheet or hot-rolled strip.

Even though it would be theoretically possible, the invention is not concerned with a single sheet point on the hot-rolled sheet or hot-rolled strip, but a plurality of points which are distributed over the hot-rolled sheet or hot-rolled strip, such that a state variable distribution over the hot-rolled sheet or hot-rolled strip can be derived. In an advantageous embodiment, the sheet points can comprise a plurality of points arranged along the length and/or over the width of the sheet or strip. This ultimately produces an array of state variables, wherein the state variable distribution, in particular temperature distribution, can be modeled between the individual points. The sheet points are usually characterized by their relative position on the hot-rolled sheet or hot-rolled strip.

From the starting point, this initial state is cyclically updated as described in the following method steps. As a point of departure for the update, information that is as close as possible to reality about the state, and in particular the state variable distribution, must therefore be available in the hot-rolled sheet or hot-rolled strip at the starting point, i.e. at the beginning of the cyclical update. This information is expressed in the initial state.

The initial state, in particular the initial temperature profiles, can essentially be determined in two ways which can also be combined. Specifically, the initial state can be determined using a measuring device or with reference to a model, but also with reference to the measured data of a measuring device and a model. When determining the initial state using a model, method steps which preceded the starting point, and their influence on state variables, are taken into consideration in such a way that the current initial state can be determined. Parameters taken into consideration here might include the furnace temperature of a preceding furnace, parameters from a cooling device, transport times, transport paths or transport speeds on roller tables, and the like. Additionally or alternatively, provision can be made for performing a state variable measurement, in particular a temperature measurement, which determines the initial state in the case of an alternative solution, and which provides additional parameters in the case of a calculation using a model.

Various locations along the rolling train are conceivable as a starting point. For example, an initial temperature measurement can already be performed before any possible heating of the slab in a furnace, wherein the effects of the furnace must be well known in this context. Measuring or determining the temperature after leaving such a furnace is more common as a starting point. However, it is also conceivable to determine the initial state, e.g. the initial temperature profiles, before the first pass in the rolling stand.

In the context of an initial precalculation, it is therefore possible to ascertain states, e.g. temperature profiles, at specific positions of the hot-rolled sheet or hot-rolled strip in the rolling process for the purpose of determining sheet processing parameters. The initial precalculation does not have to involve the initial state in this case, but can also take place after a plurality of update cycles on the basis of an already updated state. This instant is determined by an initial event, e.g. the closing of the furnace door, other possibilities also being conceivable. This is the standard precalculation which takes place using the same model of the hot-rolled sheet or hot-rolled strip and the plate rolling train. In this case, the theoretically occurring state influences are modeled on the basis of specific sheet processing parameters, wherein the positions can include in particular points of the rolling stand and/or a cooling device and/or a descaling unit which act on the hot-rolled sheet or hot-rolled strip.

From the starting point, cyclical updating of the state takes place during the course of the working process, using the model of the hot-rolled sheet or hot-rolled strip and the plate rolling train, wherein tracking of the hot-rolled sheet or hot-rolled strip, in particular the sheet points, and operating parameters which influence or represent the state, in particular the temperature, are taken into consideration. In this essential cyclically repeated method step, the state (e.g. described by the temperature profiles) is therefore continuously updated during the course of the rolling process, i.e. it is tracked almost in real time. A new state, this being described e.g. by the current temperature profiles, is therefore calculated at each instant with reference to the model and on the basis of the last known state is each case. If a component of the plate rolling train acts on the hot-rolled sheet or hot-rolled strip, the current actual operating parameters are also taken into consideration, also taking into account whether and what influence these have on the current state, e.g. the current temperature distribution. The current state therefore represents the state of the hot-rolled sheet or hot-rolled strip, and hence in particular the state variables that can be derived therefrom, at the instant of the update. In the example of the temperature, a check which is based on the current actual work parameter establishes e.g. whether a temperature influence occurred and e.g. the temperature profiles are adapted correspondingly such that they represent the temperature distribution in the hot-rolled sheet or hot-rolled strip at the instant of the update. Such continuous real-time postprocessing of the temperature can be done by means of a so-called temperature monitor. The updating can run as an independent process in this case, i.e. the update even takes place if the initial precalculation or new precalculation is taking place at the same time, for example.

This can be achieved by distributing the computing load over a plurality of processors, for example.

Operating parameters representing the state can also be incorporated into the update. Such an update using e.g. measured variables which are recorded during a measurement as operating parameters also takes place in the normal cycle, but is often separate from the purely model-based update in conceptual terms. Such a correction and adaptation of the current state on the basis of actual measured data is often referred to as adaptation, and represents a particularly advantageous feature of the method, since such a check and correction using actual measured data ensures greater reliability of the method.

In the case of a postcalculation, for example, or for the purpose of comparison with a precalculation or for the purpose of preparing a new precalculation, as a result of the continuous tracking of the state, it is therefore only necessary to retain the current state, e.g. the current set of temperature profiles, for the individual sheet points. The operating parameters which describe a state influence or represent the state need only remain in the memory until they have been incorporated into the current state as a result of the state being updated. Therefore no large quantities of data need to be stored. A further advantage of this cyclical update e.g. by means of a "temperature monitor" is that, for the purpose of postcalculation, it is only necessary to commence from the most recently updated state as a starting point. It is therefore unnecessary, for the purpose of each postcalculation or update of the state, to take the large quantity of historical operating parameters since the starting point into consideration, which would result in a long and costly calculation. Instead, the calculation time is ultimately divided into small sections over the time of the rolling process, and therefore prolonged calculations can no longer occur. The update cycle can appropriately be between 0.5 and 2 seconds, but is preferably 1 second. In summary, calculation times are therefore reduced, the peak load on a computing unit responsible for the calculation is reduced by means of the temporal division of the calculation processes and, by virtue of the faster overall execution of the calculations, the total duration of the rolling process can be accelerated.

As indicated above, a multiplicity of parameters can be used as operating parameters which influence or represent the state of the hot-rolled sheet or hot-rolled strip. Firstly, a temperature measurement which is possibly a further temperature measurement can be advantageously carried out at least one location which differs from the starting point, wherein the result of said measurement provides operating parameters for correcting and hence updating the state, in particular the temperature profiles. This constitutes an adaptation as mentioned above. Such a temperature measurement can take place in front of and/or behind the at least one rolling stand, such that a value is obtained between the relevant passes, said value giving an indication of the actual temperature of the hot-rolled sheet or hot-rolled strip at the point concerned. Such temperature measurements, which are usually made by optical means e.g. using a pyrometer, cannot generally be used as direct input values, since surface coverings of the hot-rolled sheet or hot-rolled strip can often occur during the rolling process, e.g. as a result of mill scale or water which is sprayed onto the hot-rolled sheet or hot-rolled strip. Nevertheless, such measured temperature values contain sufficiently good information as operating parameters that the state can be updated (adapted) on the basis of such measurements.

If such a temperature measuring device is arranged adjacent to the rolling stand, the temperature measurement can only be done for a part of the hot-rolled sheet or hot-rolled strip, since the hot-rolled sheet or hot-rolled strip is not too far from the working rolls for reasons of effectiveness, wherein the corrections of the unmeasured part are inferred from the corrections of the measured part. Therefore if discrepancies are found in the measured sheet parts, for example, discrepancies are inferred in the unmeasured part. In particular, an average value can be used for correcting the state in unmeasured parts of the hot-rolled sheet or hot-rolled strip. In this case, it is assumed that discrepancies which have been found are also present on average in the unmeasured sheet parts, whereupon a corresponding update (adaptation) takes place.

Apart from a temperature value, which is one of the operating parameters representing the state, operating parameters for the individual plate rolling train components can also be used. Provision can therefore be made for measuring rolling forces or torques of the rolling stand, these being dependent on state variables, and using them as operating parameters.

It is also appropriate to use parameters of a cooling device and/or a descaling device and/or the rolling stand and/or a heating device and/or the sheet speed as operating parameters which influence the state. In particular, these include operating parameters such as water quantities and temperatures, motor power, rolling speeds and other parameters. Ideally, in the context of the method, all operating parameters which are required for ascertaining each state influence, in particular temperature influence, of the hot-rolled sheet or hot-rolled strip are measured and incorporated into the state update accordingly.

Finally, the method can also comprise the step in which, as a result of at least one predetermined event occurring, future sheet processing parameters are ascertained in the context of a new precalculation which is based in particular on the current state. The initial precalculation, i.e. the first precalculation, has already been discussed in the foregoing. As a result of specific events, possibly further events, a new precalculation is carried out after the initial precalculation. The new precalculation of the states, e.g. the temperature profiles, is required in order to allow an adaptation/update of the sheet processing parameters if applicable, if the previously determined sheet processing parameters are no longer suitable for achieving the target parameters, e.g. target thickness and target quality. The current state can be used as a point of departure for the new precalculation, such that a reduction in computing time is likewise achieved here and the data compression made possible by the method is utilized. This is advantageous in time-critical situations in particular, e.g. if an adaptation of the sheet processing parameters is required when reversing after a pass. In such cases, it is possible to save valuable seconds by means of the method, such that the throughput can be increased and no further cooling of the hot-rolled sheet or hot-rolled strip occurs as a result of unnecessary stoppage times during the calculation.

A predetermined event, in particular for a new precalculation, can be e.g. the hot-rolled sheet or hot-rolled strip reaching a specific position in the working process, in particular adjacent to points of the rolling stand and/or cooling device and/or a descaling device which act on the hot-rolled sheet or hot-rolled strip, and/or a user instruction. The current position of the hot-rolled sheet or hot-rolled strip during the working is usually obtained by means of tracking. A simple check can therefore establish whether the hot-rolled sheet or hot-rolled strip has reached a specific point. When this position is reached, a new precalculation is automatically carried out on the basis of the current state. As mentioned in the introduction, it is usual to carry out a precalculation immediately when an event occurs, thereby effecting an update of the sheet processing parameters. An alternative or additional possibility for triggering a recalculation is a user instruction. In this case, an operating element is provided at the operator control desk of a user who is supervising the operation, for example, by means of which a recalculation can be triggered on the basis of observations of the user, for example.

However, if a new precalculation should not always be carried out, e.g. for reasons of calculating time, the failure of a direct or indirect comparison of the current state with the precalculated state of a previous precalculation can be used as a predetermined event. In particular, the comparison can also be performed as a result of the hot-rolled sheet or hot-rolled strip reaching a specific position in this case, in particular adjacent to points of the rolling stand and/or a cooling device and/or a descaling device which act on the hot-rolled sheet or hot-rolled strip, wherein said positions can again be ascertained by means of tracking. In this embodiment, therefore, a new precalculation is not carried out immediately such a position is reached, but a check first establishes whether a new precalculation is necessary at all, and the precalculation is only carried out if a predetermined discrepancy exists. In the example of the temperature profiles, at the positions from which temperature profiles are already known from the previous precalculation, a comparison is made with the temperature profiles which are tracked in real time and therefore current. This comparison can take place directly, but can also take place indirectly. For example, the parameters relating to rolling force and torque depend on the temperature profiles. For the purpose of indirect comparison, it is therefore also conceivable for a rolling force and a torque to be determined from the current temperature profiles, and to then be compared with the measured rolling force and the measured torque. In this context, it should also be noted that the current state is obviously always compared with the state ascertained at the position in the immediately preceding precalculation, which can be a new precalculation accordingly.

As indicated above, the sheet processing parameters can also be parameters of a cooling device and/or a descaling device and/or the rolling stand and/or a heating device and/or the sheet speed. In the context of this application, sheet speed is understood to mean not only the speed of threading into a rolling stand, but also the transport speed between the various components of the plate rolling train. The parameters which are cited and meant here are the corresponding work parameters that are used to control the corresponding components. The previously cited operating parameters can obviously also include the work parameters, said operating parameters being additionally supplemented by e.g. measurement results or the like.

An update of the sheet processing parameters and hence the control of the rolling process can be done in various ways. The adaptation essentially describes the way in which the next pass is carried out. This means that rolling speeds, threading speeds and work parameters of the descaling devices which precede the rolling stand can be updated correspondingly. In this context, it is conceivable in particular for the updating of the sheet processing parameters to comprise an asymmetric control of the upper and lower working rolls of the rolling stand. In the method, something of this type is advantageously possible if a state variable profile is examined over the depth of the hot-rolled sheet or hot-rolled strip. On the basis of this information, asymmetric control of the upper and lower working rolls of the rolling stand might be necessary in order to achieve a desired final quality.

In addition to updating the parameters of the subsequent passes, provision can also be made for the update of the sheet processing parameters to include the specification of a stoppage time and/or an additional cooling or heating operation and/or a change in the sheet speed. A temperature adaptation is ultimately effected as a result of this. In this case, provision can be made for e.g. reheating the hot-rolled sheet or hot-rolled strip if process temperatures fall below permitted levels, or letting it cool to a starting temperature which is relevant for the subsequent shaping.

A further embodiment of the method provides for the current state or variables, in particular state variables that are derived therefrom to be displayed to an operator, whereupon in particular an adaptation of sheet processing parameters can be effected by the operator. In addition to an average temperature at a point of the hot-rolled sheet or hot-rolled strip, for example, the operator can receive information about the course of the temperature in the field of the depth, e.g. the temperature on the top side, in the middle and on the underside of the hot-rolled sheet or hot-rolled strip. With reference to such information, it is also possible for an operator to recognize the necessity for a manual adaptation of sheet processing parameters, e.g. an asymmetric control of the upper and lower working rolls of the rolling stand, and to effect this personally.

The temporal course of the states and/or variables which are derived therefrom, in particular the correction variables can be retained in a memory unit for subsequent analysis with regard to the processing of further hot-rolled sheets or hot-rolled strips. Systematic errors in the precalculation can therefore be detected and the model can be adapted accordingly.

The invention also relates to a rolling train which can be controlled using the method according to the invention. In particular, a central control unit can be provided for this purpose, in which the data is collected and processed accordingly.

BRIEF DESCRIPTION OF THE DRAWINGS

Further advantages and details of the present invention are derived from the exemplary embodiments described below and with reference to the drawings, in which:

FIG. 1 shows a plate rolling train,

FIG. 2 shows a possible location of sheet points on a hot-rolled sheet, and

DETAILED DESCRIPTION OF INVENTION

Figure 3A:
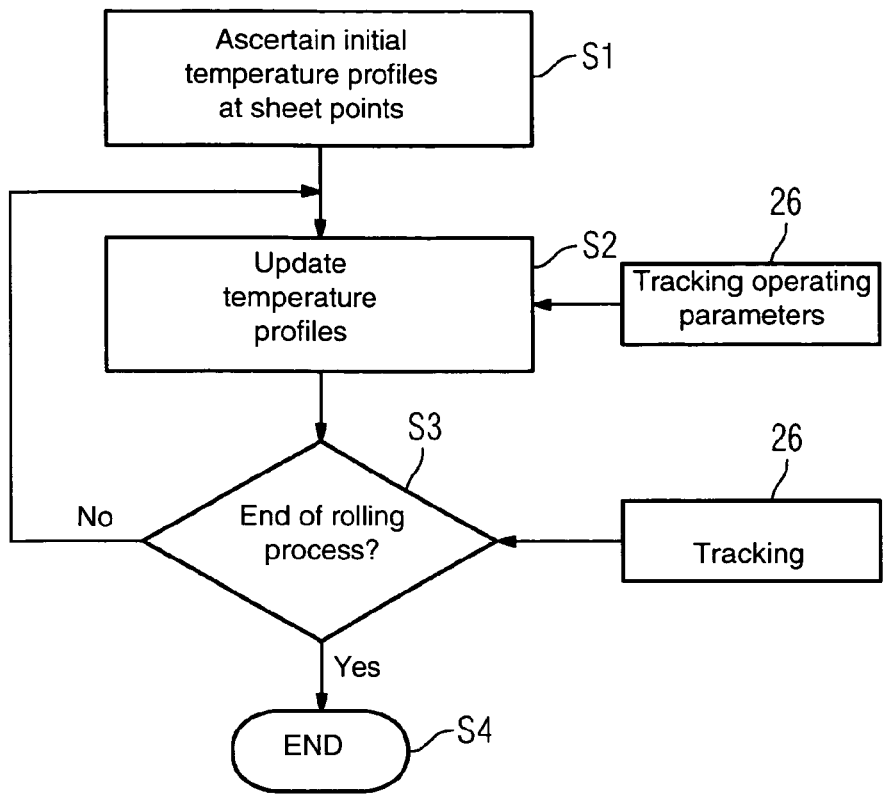
FIGS. 3A and 3B show a flowchart of the processes of the claimed method.

FIG. 1 shows a plate rolling train 1. Hot-rolled sheets 3, of which only two are shown here for the sake of clarity, are carried through the plate rolling train 1 by means of roller tables 2. The hot-rolled sheet 3 is initially reheated in a furnace 4. After leaving the furnace 4, a first temperature measurement is taken by means of a pyrometer 5. The hot-rolled sheet is cleaned of scale as fully as possible in a descaling unit 6. Provision is then made for a cooling unit 7 which is used to adapt the temperature of the hot-rolled sheet 3. A second pyrometer 8 measures the temperature of the hot-rolled sheet 3 before a rolling stand 9, and a further pyrometer 10 measures the temperature after the rolling stand 9. According to the number of passes required, the hot-rolled sheet 3 is guided through the rolling stand 9 more than once, reversing alternately from the respective side, as indicated by the arrow 11. In addition to the upper and lower working rolls 12, the rolling stand 9 comprises a secondary descaling unit 13, this being used for further descaling, at its front and rear sides. Once the hot-rolled sheet has reached the desired thickness following a plurality of passes in the rolling stand 9, it is transported to a cooling device 14 in which it is cooled accordingly. It can be seen that all of the illustrated components communicate with a central control unit 15 which is designed to carry out the control method. A display device 16 and an input device 17 are also connected to the control unit 15. The control of the individual components takes place via the communication connections 18 on the basis of sheet processing parameters, wherein these represent work parameters of the individual components and are ascertained in the context of a precalculation or specified by a user. Measured values or responses to control instructions are likewise transferred via the communication connections 18.

The illustrated plate rolling train 1 merely serves as an example. Therefore, it is firstly conceivable for further cooling units 7 or descaling units 6 to be provided. It would also be possible to provide for a further cooling unit or further furnaces in the immediate vicinity of the rolling stand 9, in order that temperature influences could be effected here also.

In the following exemplary embodiment of the method, the state is described by local temperature profiles at different sheet points of the hot-rolled sheet and the temperature is considered to be the state variable. However, it is also conceivable to choose a different description of the state, which can be defined by a parameterizable state function for example. Moreover, the described method can also be transferred to other state variables, e.g. the residual toughness or the phase distribution.

As mentioned above, the control unit 15 is designed to carry out the method. A model 19 of the hot-rolled sheet and the plate rolling train is stored therein for this purpose. By virtue of this model, precalculations are possible with effect from the starting point, by passing the pyrometer 5 in this case. With the aid of the model 19, sheet processing parameters and precalculated temperature profiles 20 at specific positions, e.g. at the action positions of individual components, are determined by means of a precalculation, possibly by means of a new precalculation (recalculation). In addition to this, from the starting point onwards, initially by means of the temperature measurement taken by the pyrometer 5, specific current temperature profiles 21 at various sheet points of the hot-rolled sheet 3 are continuously updated with reference to the operating parameters which are transferred cyclically at one-second intervals via the communication connections 18, this also being based on tracking via a tracking unit 22. The tracking of a hot-rolled sheet is sufficiently well known in the prior art and will not be described in greater detail here. The current operating parameters which influence or represent the current temperature profiles 21 of the hot-rolled sheet 3 only need to be retained until the next update, i.e. until the next cycle. The influence of preceding operating parameters on the current temperature profiles 21 is contained in the current temperature profiles 21 in any case, and therefore no necessary information is lost.

The temporal course of the temperature profiles 21, or of discrepancies and corrections that have been ascertained, can also be stored in a memory unit 23 in the control unit 15 for subsequent analysis with regard to the rolling processes of further hot-rolled sheets.

FIG. 2 shows the location of the sheet points on a hot-rolled sheet 3. The sheet points 24 are arranged lengthways and widthways in alignment on the hot-rolled sheet 3, such that a matrix is ultimately produced. For each of these sheet points 24, a temperature profile 25 is observed which represents the course of the temperature through the thickness of the hot-rolled sheet 3. By means of interpolation using the model, it is also possible to determine the complete temperature distribution in the hot-rolled sheet 3, i.e. even between the sheet points 24. This represents the thermal state of the hot-rolled sheet. Even the pyrometers 5, 8 and 10 which can take measurements above and below the hot-rolled sheet 3 ultimately only express surface temperatures, wherein the temperature course of the temperature profile 25 can be determined on the basis of physical model assumptions. In this context, it must be noted that the sheet points 24 are determined by their relative position on the hot-rolled sheet 3, i.e. the sheet points 24 retain their relative position but the distance between them changes if the hot-rolled sheet 3 is rolled lengthways.

In addition to the automatic execution of the method in the control unit 15, the current temperature profiles 21 and/or variables derived therefrom are displayed to an operator by means of the display device 16, wherein said operator can also undertake manual adaptations via an input device 17. For example, in addition to an average temperature at a sheet point 24, it is therefore also possible to output a temperature at the top side, the underside and in the middle of the hot-rolled sheet 3 at this sheet point 24, whereupon an operator can implement a different control of the working rolls 12 of the rolling stand 10.

Figure 3B:
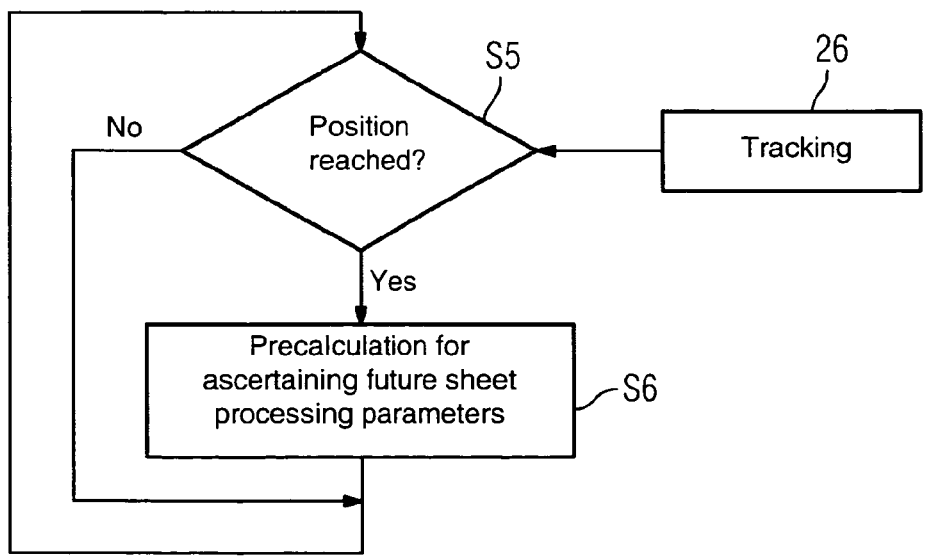

FIGS. 3A and 3B show a flowchart of the processes of the method. The method is essentially characterized by two processes which run in parallel but do not affect each other. The process shown in FIG. 3A relates to the cyclical updating of the states, and specifically to a temperature monitor in this case. The process shown in FIG. 3B triggers the initial or new precalculation in response to predetermined events. In this case, relevant input variables are specified respectively in the boxes 26 on the right-hand side.

At the starting point in step S1, the initial local temperature profile for each sheet point 24 is first ascertained in the plate rolling train 1 by means of the first temperature measurement at the first pyrometer 5. The initial state is therefore determined. This takes place with reference to the measured values with the addition of some physical model assumptions for determining the course.

The ascertained temperature profiles 21 and hence the state are now cyclically updated. The updating of the temperature profiles 21 takes place in step S2. The model 19 is utilized again in this context, wherein operating parameters which influence or represent the temperature are taken into consideration. Obviously, the tracking of the sheet points 24 is also entered. In this embodiment, consideration is essentially given to all operating parameters which can in some way influence the temperature or temperature distribution of the hot-rolled sheet 3. Continuous and current monitoring of the temperature profiles 21 is therefore possible. It is possible to enter the actual sheet processing parameters as operating parameters, but also additionally to enter measured values such as e.g. the quantity of water that is expelled, the rolling forces or torques of the rolling stand 9 or the like. Measured values describing the temperature of the hot-rolled sheet 3 are also obtained by the pyrometers 8 and 10. These too are entered into the update of the temperature profiles 21 as adaptations.

In this case, in order that the sheet is not removed so far from the working rolls 12 in the context of time optimization, it can occur that temperature measured values of the pyrometers 8 and 10 are not present for all sheet points 24. If a discrepancy is present, the remaining sheet points 24 can be corrected in the same way, and hence the temperature profile 21 adapted, by assuming an average discrepancy which is derived from the measured values.

In step S3, with reference to data from the tracking unit 22, a check establishes whether the end of the working process has been reached. In many cases, a check is also used to establish whether the tracking is complete, i.e. the method only terminates when the hot-rolled sheet is no longer tracked, and therefore the sheet processing is also still observed after the rolling process. If the end of the working process has been reached, the method is also terminated in step S4. If the end of the working process has not yet been reached, step S2 for updating the temperature profiles 21 is carried out again. This therefore takes place cyclically in each case, at an interval of one second here.

In the parallel process which is illustrated in FIG. 3B, for as long as the process in FIG. 3A runs, a check in step S5 establishes whether one of a plurality of predetermined positions has been reached, i.e. a corresponding event has occurred. If no event has occurred, the step S5 is repeated, i.e. a check for events is carried out for as long as the method, and hence the cyclical updating of the temperature profiles 21, takes place.

Relative to time, the first event that occurs is the initial event. It determines when the first i.e. initial precalculation is carried out in step S6. The initial event can also be the starting point, but is generally only established after a plurality of updates, e.g. when the furnace door is closed.

During the initial precalculation in step S6, the model 19 of the hot-rolled sheet 3 and the plate rolling train 1 is used, wherein theoretical temperature profiles 20, i.e. state variables, are ascertained at specific positions of the hot-rolled sheet 3 in the working process for the purpose of determining sheet processing parameters. In this case, the positions can be selected as, or are in the vicinity of, action points of the components of the plate rolling train 1. In this case, a position can also be reached more than once due to the reversing insertion in the rolling stand 9, and therefore the positions with the precalculated temperature profiles 20 generally also include a component which relates to the time-relative operation. In this case, the sheet processing parameters are control parameters or working parameters of the individual components of the plate rolling train 1, and therefore describe how the next pass is to be carried out, for example, what quantities of water are to be sprayed onto the hot-rolled sheet 3 at what pressure, etc.

After the initial precalculation, a check in step S5 again establishes whether further events have occurred.

If a corresponding event has occurred, a new precalculation i.e. a recalculation takes place in step S6, wherein updated sheet processing parameters are ascertained. As a result of updating the sheet processing parameters, it is ensured that the desired target parameters can be achieved using the future sheet processing parameters. The new precalculation is done on the basis of the model 19 again, wherein the current temperature profile 21 at the sheet points 24 is used as a starting point. The results of this new precalculation replace the results of the original precalculation or a previous new precalculation.

The event which results in a new precalculation does not necessarily have to be the reaching of predetermined positions, in particular the action points of specific components of the plate rolling train 1. It is also conceivable for a user to enter a user instruction, e.g. via an operating element, in order to trigger a new precalculation.

In certain configurations, it is also advantageous for the new precalculation to take place only after a comparison of the precalculated temperature profiles 20 with the current temperature profiles 21 of the hot-rolled sheet 3 at the positions. If no discrepancy occurs, the method continues with step S6, but if a discrepancy which is greater than a predetermined value is found, the precalculation takes place in step S6. In this case, it should be noted that any comparison is always made with the precalculated temperature profiles 21 which were ascertained on the basis of the most recent new precalculation at the specific positions.

The cyclical updating of the temperature profiles continues in step S2 during the precalculations.

While the method is being executed as described, the current temperature profiles 21, or information or variables that are derived therefrom, are displayed to an operator on the display device 16, such that the operator can also intervene personally in the rolling process and change sheet processing parameters if applicable. These sheet processing parameters which have been changed by an operator are obviously also taken into consideration in the context of the method, since they have priority over calculated sheet processing parameters.

As a result of the update performed in step S2 of the temperature profiles 21, all of the information that is relevant for the further course of the rolling process and derived from the operating parameters is combined, such that operating parameters which were entered into the updating of the temperature profile 21 do not have to be stored any longer. The postcalculation in step S2 can therefore be performed very quickly, as only influences since the last update must be taken into consideration. In step S6, a new precalculation which uses the current temperature profiles as a starting point also requires less computing time. This saves computing power and increases throughput because unnecessary waiting times are avoided.

The invention claimed is:

1. A method for monitoring a physical state of a hot-rolled, sheet, comprising:

providing a rolling train with a rolling stand for reverse rolling of a hot-rolled sheet;

providing a central control unit for controlling the rolling train;

providing a model of the hot-rolled sheet and the rolling train stored in the central control unit;

reverse rolling the hot-rolled sheet;

determining, at a starting point, a physical state of the hot-rolled sheet in the model, wherein the physical state of the hot-rolled sheet is a characteristic which is described with reference to a mathematical model and which is relevant for the reverse rolling of the hot-rolled sheet;

deriving a physical state variable from the physical state;

cyclically updating the physical state variable during the reverse rolling of the hot-rolled sheet by using the model of the hot-rolled sheet and the rolling train, wherein an update cycle is between 0.5 and 2 seconds; and measuring operating parameters of the hot-rolled sheet or the rolling train, wherein the operating parameters are used for the cyclically updating the physical state, wherein the operating parameters are measured at a location which is different from a location of the starting point.

2. The method as claimed in claim 1, wherein the physical state variable is selected from the group consisting of a temperature variable, a residual work-hardness variable, a phase portion variable, a grain size variable, a enthalpy variable.

3. The method as claimed in claim 1, wherein the physical state is described by at least one physical state variable at various points of the hot-rolled sheet, wherein the various points are a plurality of points arranged along a length and over a width of the hot-rolled sheet.

4. The method as claimed in claim 3, wherein the physical state is described by local temperature profiles at the various points.

5. The method as claimed in claim 1, wherein the physical state is determined using a measuring device and/or with reference to a model.

6. The method as claimed in claim 1, wherein, responsive to a predetermined event occurring, pre-calculated physical states and future sheet processing parameters derived therefrom are iteratively ascertained in a context of a pre-calculation based upon a current physical state.

7. The method as claimed in claim 6, wherein the predetermined event is the hot-rolled sheet reaching a specific position adjacent to points of the rolling stand and/or a cooling device and/or a descaling device and/or a user instruction.

8. The method as claimed in claim 6, wherein the predetermined event is a failure of a direct or indirect comparison of the current physical state with a pre-calculated physical state.

9. The method as claimed in claim 8, wherein the comparison is performed as a result of the hot-rolled sheet reaching a specific position adjacent to points of the rolling stand and/or a cooling device and/or a descaling device.

10. The method as claimed in claim 6, wherein parameters of a cooling device and/or a descaling device and/or the rolling stand and/or a heating device and/or a sheet speed are used as sheet processing parameters.

11. The method as claimed in claim 10, wherein an updating of the sheet processing parameters comprises a specification of a stoppage time and/or an additional cooling or heating operation and/or a change in the sheet speed.

12. The method as claimed in claim 10, wherein an updating of the sheet processing parameters results in an asymmetric control of upper and lower working rolls of the rolling stand.

13. The method as claimed in claim 6, wherein current physical state and/or physical state variables derived from the current physical state, are displayed to an operator, wherein an adaptation of sheet processing parameters are carried out by the operator.

14. The method as claimed in claim 1, wherein a measuring device is arranged adjacent to the rolling stand, a measurement is only done for a part of the hot-rolled sheet, and wherein corrections of an unmeasured part of the hot-rolled sheet are inferred from corrections of a measured part.

15. The method as claimed in claim 1, wherein rolling forces or torques of the rolling stand, which are dependent on the physical state variable, are used as operating parameters.

16. The method as claimed in claim 1, wherein the operating parameters comprise parameters of a cooling device and/or a descaling device and/or the rolling stand and/or a heating device and/or a sheet speed.

17. The method as claimed in claim 1, wherein a temporal course of the physical state and/or correction variables derived from the current physical state are retained in a memory unit of the central control unit for subsequent analysis with regard to a processing of further hot-rolled sheets.

* * * * *